Feb. 27, 1945. J. D. MORGAN ET AL 2,370,606
APPARATUS FOR TESTING LUBRICANTS
Filed June 10, 1943 2 Sheets-Sheet 2
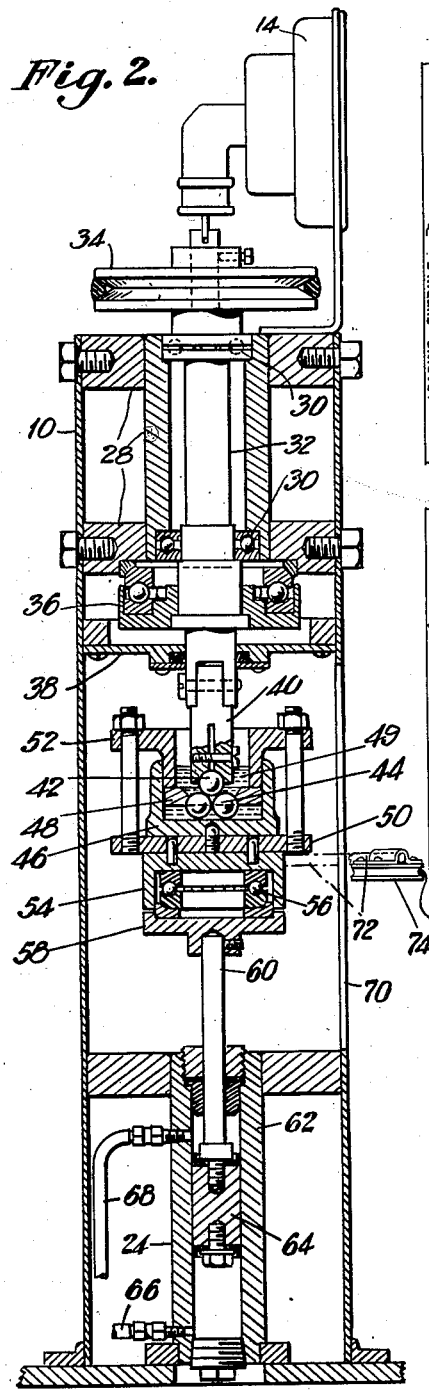
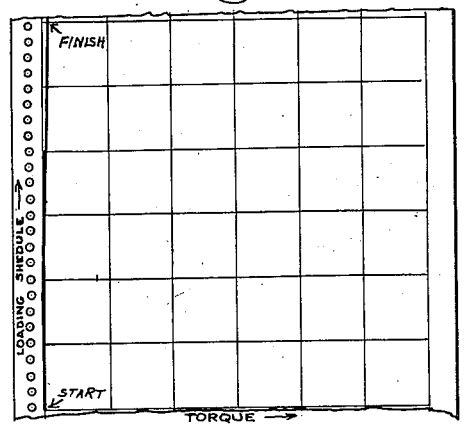
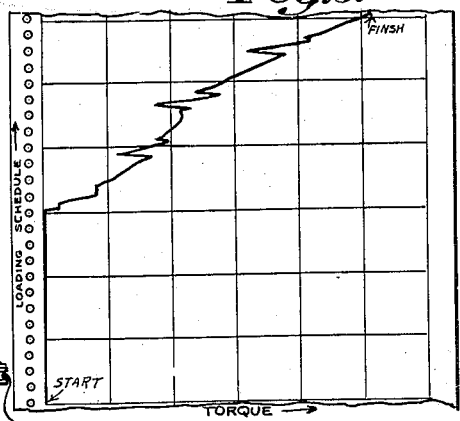
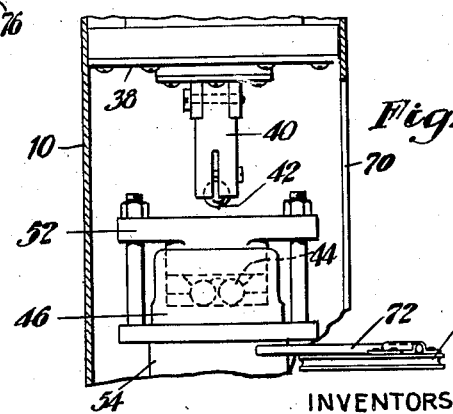
INVENTORS
JOHN D. MORGAN
THOMAS ANDERSON
BY
ATTORNEY Patented Feb. 27, 1945

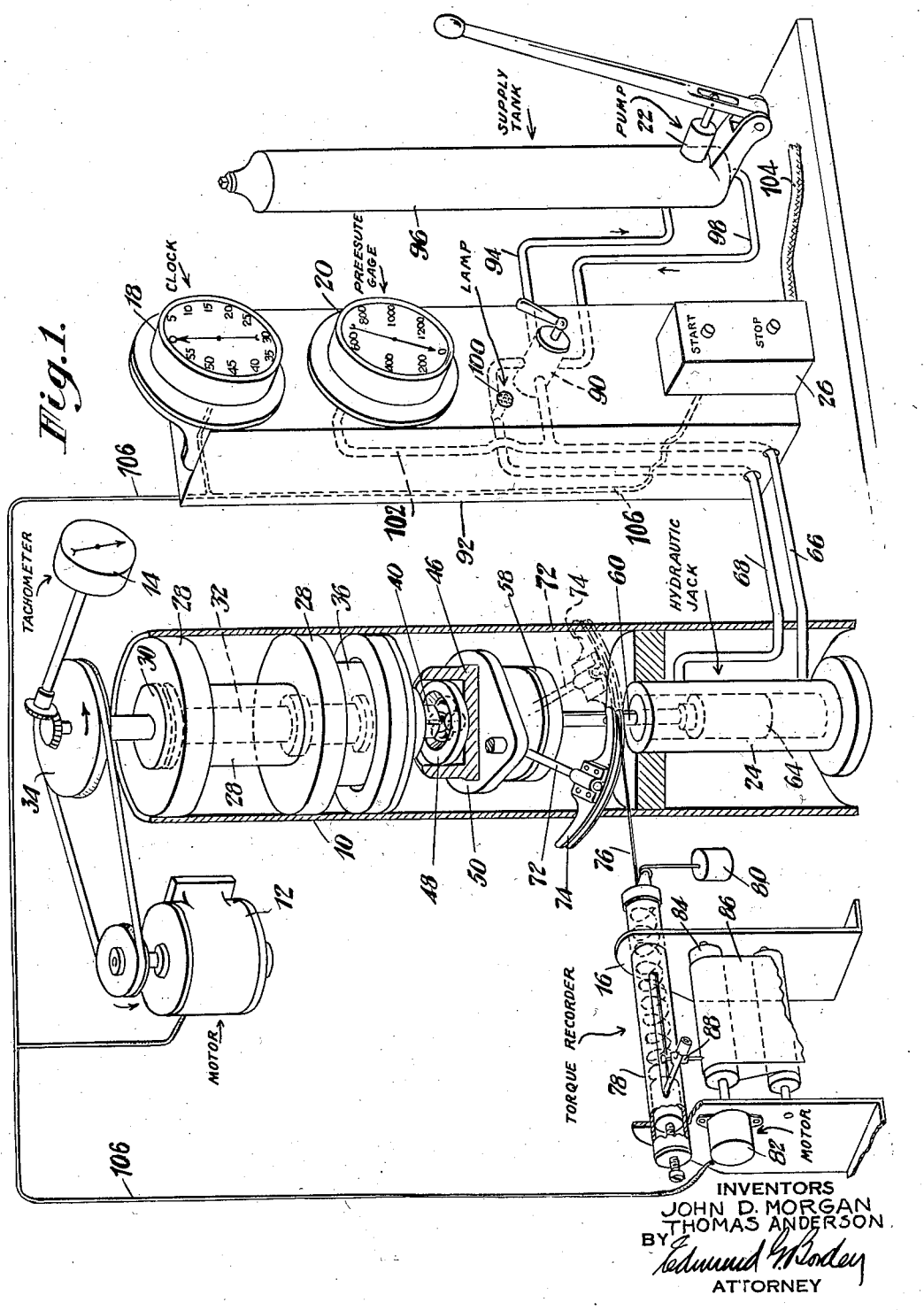

2,370,606

UNITED STATES PATENT OFFICE 2,370,606

APPARATUS FOR TESTING LUBRICANTS

John D. Morgan, South Orange, and Thomas Anderson, Elizabeth, N. J., assignors to Cities Service Oil Company, New York, N. Y., a corporation of Pennsylvania Application June 10, 1943, Serial No. 490,274

5 Claims. (Cl. 73—9)

This invention relates to improvements in lubricating testing apparatus, and more particularly to improvements in four-ball testing apparatus in which a bearing ball is rotated in the cavity formed by three smaller bearing balls held in the same plane.

Lubricant testing apparatus employing the four-ball arrangement provides a simple and easy means to obtain rapid test results. Furthermore, the cost of operating the apparatus is very low. Ball bearings are easy to obtain, are accurate in shape, consistent in material, and relatively inexpensive compared to the test pieces used in many lubricant testing machines.

The primary object of the present invention is to provide an improved four-ball lubricant testing apparatus in which a loading rate against torque chart may be readily obtained.

A further object of the invention is to provide an apparatus of the type described in which a definite loading schedule may be readily secured.

Another object of the invention is to provide an improved four-ball lubricant testing apparatus having improved features of construction and arrangement particularly adapted to facilitate the testing of lubricants and other materials for load-carrying properties.

Another object of the invention is to provide an improved method of operation of said machine so that a liquid can be quickly rated as to film strength and load-carrying capacity.

The improved apparatus constructed in accordance with the features of the present invention is illustrated in the accompanying drawings and described in detail hereinafter.

In the drawings:

Fig. 1 is a perspective view with certain parts cut away, showing in a diagrammatic manner the various elements of the testing apparatus and the manner in which these elements are connected, and cooperate.

Fig. 2 is a vertical sectional view showing the details of construction and arrangement of the four-ball tester.

Fig. 3 is a broken view showing a portion of the four-ball testing apparatus of Fig. 2 with certain parts in extended position.

Figs. 4 and 5 are views showing loading rate-torque charts.

Referring to Fig. 1 of the drawings in which a general arrangement of the apparatus is shown as mounted on a platform, the improved testing assembly comprises a four-ball tester 10 operated by a motor 12, a speed indicator or tachometer 14, a torque recorder 16, an electric clock 18, a pressure gauge 20, and a pump 22 for supplying liquid to a hydraulic jack 24. The motor 12, recorder 16 and clock 18 are all started and stopped from the same electric switch 26.

The four-ball tester 10 per se is shown in Fig. 2 and comprises an outer cylindrical steel casing welded or otherwise fastened in upright position to the platform. In the upper part of the steel casing is mounted an alignment bearing block arrangement 28 fastened in the casing by means of studs, as shown. This block includes upper and lower sets of ball bearings 30, supporting a spindle 32 machined to receive bearing collars, as shown. The upper part of the spindle 32 extends above the casing and mounts a drive pulley 34 which is driven by the motor 12. The extreme upper part of the spindle 32 is keyed or suitably geared to the tachometer 14, as shown. Immediately below the lower set of ball bearings 30 a thrust bearing 36, also provided with ball bearings, is mounted on a shoulder of the spindle 32 and set against the bearing block 28, to take an upward thrust as shown. The above described bearings are enclosed from below by means of a plate 38 provided with a packing around the spindle 32.

The lower portion of the spindle 32 includes a removable terminal section 40, the lower end of which is slotted and machined out to form a clamp for a steel bearing ball 42 which is rigidly held in the end of the spindle. In the operation of the apparatus, the ball 42 is rotated in the pocket or cavity formed by three similar balls 44, held in a cup 46 under a follower ring 48 which fits inside the cup and is provided with a conical shaped opening in which the three balls 44 are clamped. The opening in the ring 48 has a conical shaped wall from both above and below. The cup 46 holds the lubricant 49, or other material to be tested, and is centered on a clamping plate 50 by a stud as shown. The ring 48 is forced over the balls 42 by means of an upper clamping member 52 provided with an annular flange which extends into the cup and onto the periphery of the ring 48. The members 50 and 52 are drawn together by means of bolts, as shown, to rigidly clamp the bearing balls 44.

The plate 50, holding the cup assembly, rests on an inverted cup 54 with which it is centered and pinned to prevent relative rotation, as shown. The cup 54 encloses a set of ball bearings 56 supported by a stationary plate 58, mounted on and keyed to the upper end of a piston rod 60. The piston rod 60 is operated by the hydraulic jack 24 comprising a cylinder 62 centered in the lower part of the steel outer casing, and a piston 64 having an area of one square inch. Hydraulic fluid is supplied to the cylinder 62 below the piston 64 through a line 66 and to the cylinder above the piston 64 through a line 68. The jack assembly is shown in detail in Fig. 2, and the piston 64 is shown in substantially its upper position with the steel bearing ball 42 resting directly in the cavity formed by the three balls 44. Fig. 3 shows the cup assembly in lowered position ready for removal from the testing machine through an opening 70 in the side of the outer steel casing.

It will be apparent from the above description that the cup assembly containing the three balls 44 is free to rotate on the set of ball bearings 56. The cup assembly is therefore provided with a torque arm 72, six inches long, which is attached to the inverted cup 54 and extends through the opening 70 in the steel casing. The arm 72 terminates in a circular head or guide 74 which is concentric with the cup assembly. A cable 76 is attached to the forward end of the guide and transmits the action of the torque arm to a calibrated spring in the recorder 16. The cable 76 operates on the guide 74, regardless of the position of the arm 72 so as to maintain a constant leverage.

The relationship of the torque arm and cable 76, and the recorder 16, is shown more in detail in Fig. 1 in which the cable is attached to a calibrated spring in a casing 78. The spring has a load rate of one pound per inch, and is normally under an initial load of a little more than one half pound applied by a weight 80, in order to overcome any friction. The particular spring employed has a total load of six pounds, or provides for a spring deflection of six inches. The recorder includes a motor 82 which receives current from switch 26 and drives a roll 84 at a constant predetermined speed, and pulls a perforated chart 86 from a chart roll, as shown. The free end of the spring mounting in casing 78 is provided with a pencil holder 88 so that the torque is recorded by a pencil on the chart 86. The cylinder 78 is provided with an adjusting screw for setting the spring for the proper line on the chart, and provision is also preferably made for adjusting the weight 80 so that zero torque will coincide with the zero line on the chart. The movement of the torque arm 72 is indicated by the dotted line showing in Fig. 1.

The pipe lines 66 and 68 terminate in a four-way valve 90 (Fig. 1) mounted in a housing 92 which also mounts the clock 18, the pressure gauge 20 and the start and stop switch mechanism 26. The four-way valve 90 also connects through a return line 94 with a tank 96 for the hydraulic fluid used in the jack 24. The pump 22 connects directly into the tank 96 and forces hydraulic fluid through a line 98 into the four-way valve 90 by which the liquid may be directed either into the line 66 or the line 68 for the operation of the jack 24. The line 68 is provided with a hydraulic switch not shown, which lights a warning lamp 100 on the front of the housing 92 when the hydraulic fluid is directed by the valve 90 through the line 68 to the upper part of the cylinder of the jack 24 to lower the cup assembly. The pressure gauge 20 is conneced directly to the pressure line 66 by line 102. Electricity is supplied to the apparatus by an electric cable 104 which connects directly into the switch 26, from which current is supplied to the clock 18, the motor 12 and the motor 82, by an electric cable 106 and suitable branches as shown.

In the use of the apparatus, the lubricating oil 49, or other liquid, grease or lubricant to be tested is placed in the cup 46 in sufficient quantity to completely cover the bearing balls 44 and the ring 48, the four-way valve 90 is set to supply hydraulic liquid through line 66, and the hand of the electric clock is reset to zero, the clock dial being marked off to show 60 seconds. The operator thereupon presses the start button of the master switch 26 and operates the handle of the pump 22 while watching the pressure gauge and the clock so as to apply a predetermined loading schedule on the bearing balls 42 and 44. When the start button is pushed, the motors 12 and 82 also start and the spindle 32 is brought to a constant predetermined speed almost immediately, as shown by the meter 14. The operator presses the stop button on the switch 26 when the second hand of the clock 18 completes a revolution, or more as decided upon. The operator may then tear off the chart which will show the torque for the material under test at the loading schedule or rate used. Illustrative charts are shown in Figs. 4 and 5 of the drawings. Furthermore, the valve 90 may be reversed so that the cup mechanism can be removed, the bearing balls 44 taken out as well as the ball 42 for a study of the wear marks. If desired, the marks on the bearing balls 42 and 44 may be measured by a micrometer under a microscope. It will be apparent that the whole cup assembly is readily removable above the inverted cup 54, and that the ball 42 may be readily unclamped and released. A new set of bearing balls is preferably used for each test. However, where the balls are slightly marked, they may be reused by rotating them in the clamps to expose unmarred surfaces.

The strip of chart shown in Fig. 4 illustrates the type of torque line obtained on a material having a high load-carrying capacity, since the torque line, the "start" and "finish" of which are indicated, shows no break and follows very closely the zero torque marginal line. The loading rate or schedule is along the left side of the chart and the torque along the bottom. The section of chart shown in Fig. 5 illustrates a different torque type of line with the "start" and "finish" points indicated. It will be noted that the load applied for about the first half of time showed no break in the torque line but that the further application of pressure on the rotating ball 42 produced a torque line of rather abruptly but irregularly increasing torque to the end of the test period, during increased loading.

A preferred method of operating the four-ball testing machine is to set up the lubricant cup 46 as shown in Fig. 2 and with everything ready to start, run the apparatus for ten seconds without any load applied by the jack 24. At the end of ten seconds, a fifty-pound load is applied by the operation of the pump 22, and the load is then increased by fifty pounds every five seconds until the pressure gauge reaches 1000 pounds, or until the apparatus fails to function with the particular lubricant or liquid, such as may occur when the balls become welded together. Under these conditions the torque chart will show clearly the relative value of the liquid under test. This method of operation takes less than two minutes whereas other methods and other machines formerly required an hour or more to complete a test.

The testing apparatus of the present invention as shown by the foregoing description, provides a rapid and efficient means for evaluating greases, oils, cutting compounds and other liquids, since the charts which are ready as soon as the test apparatus is stopped, show clearly the value of the material tested. Certain modifications may be made in the apparatus which are intended to come within the spirit and scope of the appended claims.

Having described the invention, what is claimed as new is:

1. In a four-ball lubricant testing apparatus in which a bearing ball is rotated against three bearing balls held in a mounting which is free to rotate, the balls being covered with the lubricant or other material to be tested, means for measuring and recording the torque created in the mounting for the three balls, means for applying a progressively increasing pressure between the rotating ball and the three balls, and means for simultaneously starting or stopping the rotation of said ball, the recording means, and the application of pressure between said bearing balls.

2. A four-ball apparatus as defined by claim 1 in which the means for applying pressure between the rotating ball and the three balls comprises a hydraulic jack having a piston with an area of one square inch, means for supplying a hydraulic liquid to the cylinder of the said jack on either side of the piston, and a four-way valve in said supplying means for directing the fluid to the desired side of the piston.

3. An apparatus as defined by claim 1 in which the means for applying pressure between the rotating ball and the three balls includes a hydraulic jack having a cylinder and a piston therein with an area of one square inch, a line for supplying a hydraulic fluid to the cylinder of said jack below the piston and a direct reading pressure gauge connected into said line.

4. In a four-ball testing apparatus in which a bearing ball is rotated against three bearing balls held in a mounting, the balls being covered by the material to be tested, means for applying a pressure between the rotating ball and the three balls comprising a hydraulic jack having a piston with an area of one square inch connected to a piston rod acting against the mounting of said three balls, a line for supplying hydraulic fluid to the cylinder of the jack below the piston, a direct reading pressure gage connected with said line, a line for supplying hydraulic fluid to the cylinder of the jack above the piston, a four-way valve connecting said lines, a pump for hydraulic fluid, and a line therefrom connected into said four-way valve.

5. In a four-ball testing apparatus in which a bearing ball is rotated against three bearing balls held in a mounting, the balls being covered by the material to be tested, means for applying a pressure between the rotating ball and the three balls comprising a hydraulic jack having a cylinder and a piston therein with an area of one square inch, a piston rod connected to said piston and acting against the mounting of said three balls, a line for supplying hydraulic fluid to the cylinder of said jack below the piston and a direct reading pressure gage connected into said line.

JOHN D. MORGAN.
THOMAS ANDERSON.